(12) United States Patent
Nenniger et al.

(10) Patent No.: US 8,776,900 B2
(45) Date of Patent: Jul. 15, 2014

(54) METHODS AND APPARATUSES FOR ENHANCED IN SITU HYDROCARBON PRODUCTION

(76) Inventors: John Nenniger, Calgary (CA); Emil Nenniger, Oakville (CA)

( * ) Notice: Subject to any disclaimer, the term of this patent is extended or adjusted under 35 U.S.C. 154(b) by 867 days.

(21) Appl. No.: 12/374,190

(22) PCT Filed: Jul. 18, 2007

(86) PCT No.: PCT/CA2007/001267
§ 371 (c)(1),
(2), (4) Date: Oct. 1, 2009

(87) PCT Pub. No.: WO2008/009114
PCT Pub. Date: Jan. 24, 2008

(65) Prior Publication Data
US 2010/0096147 A1    Apr. 22, 2010

(30) Foreign Application Priority Data

Jul. 19, 2006 (CA) .................................. 2552482

(51) Int. Cl.
*E21B 43/24* (2006.01)
*E21B 43/16* (2006.01)
*E21B 43/30* (2006.01)
*E21B 43/25* (2006.01)

(52) U.S. Cl.
CPC ........... *E21B 43/2406* (2013.01); *E21B 43/166* (2013.01); *E21B 43/305* (2013.01); *E21B 43/164* (2013.01); *E21B 43/255* (2013.01)
USPC ........ 166/401; 166/268; 166/266; 166/272.7; 166/275; 166/50; 166/52

(58) Field of Classification Search
None
See application file for complete search history.

(56) References Cited

U.S. PATENT DOCUMENTS 2,412,765 A   12/1946  Buddrus et al.
2,896,725 A   7/1959   Reed
(Continued)

FOREIGN PATENT DOCUMENTS

CA    1059432    7/1979
CA    1065758    11/1979
(Continued)

OTHER PUBLICATIONS

Butler, R. & Mokrys, I., "A new process (VAPEX) for recovering heavy oils using hot water and hydrocarbon vapour", The Journal of Canadian Petroleum Technology, Jan.-Feb. 1991, The CIM/SPE Annual Technical Conference, p. 97-106, vol. 30, No. 1.

(Continued)

*Primary Examiner* — Zakiya W Bates
*Assistant Examiner* — Silvana Runyan
(74) *Attorney, Agent, or Firm* — Vidas, Arrett & Steinkraus (57) ABSTRACT

A process for recovering hydrocarbons from an in situ formation. The process includes the steps of injecting solvent though an injection well into an underground extraction chamber having a hydrocarbon extraction interface, warming the hydrocarbons at the extraction interface to cause the hydrocarbons to flow downwardly by gravity drainage. Barrier gases naturally emerge in the chamber as a result of the extraction process and are removed from the extraction interface to improve heat transfer from said solvent to said interface. The last step is to recover liquids such as hydrocarbons and water through a production well. The invention provides a separate flow path to remove hydrocarbon gases from the chamber at a preferred location. The preferred location is near the top of the chamber where the accumulated barrier gases help to limit the heat loss and can also provide a barrier to help maintain chamber integrity and confinement.

24 Claims, 5 Drawing Sheets

(56) References Cited

U.S. PATENT DOCUMENTS

| | | |
|---|---|---|
| 3,351,132 A | 11/1967 | Dougan et al. |
| 3,512,585 A | 5/1970 | Allen |
| 3,607,134 A | 9/1971 | McIntyre |
| 3,608,638 A | 9/1971 | Terwilliger |
| 3,856,086 A | 12/1974 | Braden, Jr. |
| 3,913,672 A | 10/1975 | Allen et al. |
| 3,954,141 A | 5/1976 | Allen et al. |
| 3,990,513 A | 11/1976 | Perch |
| 4,004,636 A | 1/1977 | Brown et al. |
| 4,007,785 A | 2/1977 | Allen et al. |
| 4,007,786 A | 2/1977 | Schlinger |
| 4,008,764 A | 2/1977 | Allen |
| 4,022,277 A | 5/1977 | Routson |
| 4,127,170 A | 11/1978 | Redford |
| 4,160,479 A | 7/1979 | Richardson et al. |
| 4,280,559 A | 7/1981 | Best |
| 4,335,620 A | 6/1982 | Adams |
| 4,344,485 A | 8/1982 | Butler |
| 4,344,486 A | 8/1982 | Parrish |
| 4,362,213 A | 12/1982 | Tabor |
| 4,372,383 A | 2/1983 | Ames |
| 4,407,367 A | 10/1983 | Kydd |
| 4,418,752 A | 12/1983 | Boyer et al. |
| 4,450,913 A | 5/1984 | Allen et al. |
| 4,513,819 A | 4/1985 | Islip et al. |
| 4,531,586 A | 7/1985 | McMillen |
| 4,550,779 A | 11/1985 | Zakiewicz |
| 4,560,003 A | 12/1985 | McMillen et al. |
| 4,673,484 A | 6/1987 | Babcock et al. |
| 4,697,642 A | 10/1987 | Vogel |
| 4,753,293 A | 6/1988 | Bohn |
| 4,836,935 A | 6/1989 | Lilienthal |
| 4,884,635 A | 12/1989 | McKay et al. |
| 5,018,576 A | 5/1991 | Udell et al. |
| 5,109,928 A | 5/1992 | McCants |
| 5,131,471 A | 7/1992 | Duerksen et al. |
| 5,145,003 A | 9/1992 | Duerksen |
| 5,224,536 A | 7/1993 | Eigen et al. |
| 5,407,009 A | 4/1995 | Butler et al. |
| 5,446,263 A | 8/1995 | Eigen et al. |
| 5,607,016 A | 3/1997 | Butler |
| 5,720,350 A | 2/1998 | McGuire |
| 5,771,973 A | 6/1998 | Jensen et al. |
| 5,795,784 A | 8/1998 | Arnquist et al. |
| 5,899,274 A * | 5/1999 | Frauenfeld et al. ............ 166/401 |
| 6,230,814 B1 | 5/2001 | Nasr et al. |
| 6,296,809 B1 | 10/2001 | Richards et al. |
| 6,318,464 B1 * | 11/2001 | Mokrys ...................... 166/252.1 |
| 6,405,799 B1 | 6/2002 | Vallejos et al. |
| 6,511,601 B2 | 1/2003 | McMurtrey et al. |
| 6,644,400 B2 | 11/2003 | Irwin, Jr. |
| 6,662,872 B2 * | 12/2003 | Gutek et al. ............... 166/272.4 |
| 6,883,607 B2 | 4/2005 | Nenniger et al. |
| 7,363,973 B2 | 4/2008 | Nenniger et al. |
| 7,514,041 B2 | 4/2009 | Conquorgood et al. |
| 7,727,766 B2 | 6/2010 | Nenniger et al. |
| 2003/0015321 A1 | 1/2003 | Lim et al. |
| 2003/0015458 A1 * | 1/2003 | Nenniger et al. ............ 208/428 |
| 2003/0041663 A1 | 3/2003 | Kossuth et al. |
| 2003/0159828 A1 * | 8/2003 | Howard et al. ............... 166/372 |
| 2010/0163229 A1 | 7/2010 | Nenniger |

FOREIGN PATENT DOCUMENTS

| | | |
|---|---|---|
| CA | 1102234 | 6/1981 |
| CA | 1122115 | 4/1982 |
| CA | 1141654 | 2/1983 |
| CA | 1208122 | 7/1986 |
| CA | 2108349 | 11/1993 |
| CA | 2147079 | 10/1996 |
| CA | 2185837 | 3/1998 |
| CA | 2243105 | 8/1999 |
| CA | 2235085 | 10/1999 |
| CA | 2567399 | 10/1999 |
| CA | 2241478 | 12/1999 |
| CA | 2251157 | 4/2000 |
| CA | 2270703 | 10/2000 |
| CA | 2281276 | 2/2001 |
| CA | 2304938 | 2/2001 |
| CA | 2323029 | 4/2001 |
| CA | 2299790 | 8/2001 |
| CA | 2633061 | 8/2001 |
| CA | 2351148 | 12/2002 |
| CA | 2374115 | 9/2003 |
| CA | 2436158 | 1/2005 |
| CA | 2549614 | 12/2007 |
| CA | 2552482 | 1/2008 |
| CA | 2591354 | 12/2008 |

OTHER PUBLICATIONS

Butler, R. & Mokrys, I., "Closed-Loop Extraction Method for the Recovery of Heavy Oils and Bitumens Underlain by Aquifers: The Vapex Process", Petroleum Society of CIM and CANMET, Oct. 1993, Paper No. CIM.

Bulter, R. & Mokrys, I., "Recovery of Heavy Oils Using Vapourized Hydrocarbon Solvents: Further Development of the Vapex Process", The Journal of Canadian Petroleum Technology, Jun. 1993, pp. 56-62, vol. 32, No. 6.

Das, S. & Butler, R., "Effect of Asphaltene Deposition on the Vapex Process: A Preliminary Investigation Using a Hele-Shaw Cell", The Journal of Canadian Petroleum Technology, Jun. 1994, pp. 39-45, vol. 33, No. 6.

Das, S. & Butler, R., "Extraction of Heavy Oil and Bitumen Using Vaporized Hydrocarbon Solvents", Petroleum Science and Technology, 1997, pp. 51-75, vol. 15 (1&2).

Das, S., "Optimum Solvent Injection Strategy for Vapex Operation", The Petroleum Society, Jun. 1997, Paper No. 97-63.

Mokrys, I. & Butler, R., "In-Situ Upgrading of Heavy Oils and Bitumen by Propane Deasphalting: The Vapex Process", The Society of Petroleum Engineers, Inc., Mar. 1993, pp. 409-424, Paper No. 25452.

Palmgren, C. & Edmunds, N., "High Temperature Naptha to Replace Steam in the SAGD Process", Society of Petroleum Engineers, Inc., Jun. 1995, pp. 475-485, Paper No. 30294.

Singhal, A. et al., "Screening of Reservoirs for Exploitation by Application of Steam Assisted Gravity Drainage/Vapex Processes", Society of Petroleum Engineers, Inc., Nov. 1996, Paper No. 37144.

* cited by examiner

METHODS AND APPARATUSES FOR ENHANCED IN SITU HYDROCARBON PRODUCTION

FIELD OF THE INVENTION

This invention relates generally to the recovery of hydrocarbons such as heavy oil or bitumen from underground hydrocarbon bearing formations. In particular, this invention relates to the in situ recovery of such hydrocarbons through the use of gravity drainage techniques.

BACKGROUND OF THE INVENTION

Gravity drainage is a known technique for the in situ extraction of hydrocarbons. At present it is mainly performed by the injection of steam into the hydrocarbon bearing formation. However, it may also be performed by the injection of a solvent. Essentially, in a gravity drainage extraction process, the steam or solvent vapour is injected into a formation from a generally horizontal injection well and recovered from a lower parallel-running generally horizontal production well. An extraction chamber gradually develops in the formation as the oil or bitumen is removed from the reservoir above and between the wells. As the vapour flows towards the perimeter of the chamber, it encounters lower temperatures. These temperatures result in a condensation of the vapour and the transfer of heat to the sand and bitumen, causing the bitumen to warm up. In a solvent based process the warmth reduces the viscosity of the bitumen, thereby allowing the solvent to penetrate rapidly into the bitumen. The mobilized bitumen and the liquid solvent drain towards the bottom of the chamber and are then recovered from the formation through the production well located near the bottom of the chamber. As the mobilized bitumen drains downward, fresh bitumen becomes exposed at an extraction interface that is subsequently exposed to the vapour, such as the condensing solvent and becomes in turn mobilized. This bitumen depleted extraction chamber is called a gravity drainage chamber.

In such gravity drainage processes, to ensure that the vapour does not short circuit directly from the injection well to the production well, the chamber is operated with a minimum liquid head over the production well. This helps to ensure that the vapour seeks out the cold condensing surface at the extraction interface. All that is required is to restrict the liquid production from the production well to ensure that the production well is always immersed in liquid solvent (or water in the case of SAGD) and bitumen so no separate vapour path out of the chamber exists.

In a prior patent application the inventors taught that the presence of other gases in a solvent vapour based gravity drainage extraction chamber that are less condensable than the solvent being used was an impediment to solvent based gravity drainage processes. Such gases tend to be left behind in the extraction chamber as the solvent condenses and thus tend to accumulate in the chamber. If the concentration becomes large enough, they act as barrier gases. The poisoning effect of such gases on the extraction process can be mitigated through the use of high purity solvent (thus reducing the amount of such non-condensable gas that is added to the chamber during the extraction process in the first place) and controlling reservoir conditions to encourage the non-condensable components to be removed in a liquid form.

There are several key advantages for solvent assisted gravity drainage over steam assisted gravity drainage, including the in situ upgrading and the ability to achieve commercially attractive extraction rates at much lower temperatures and pressures. Thus, solvent extraction provides gains in both energy efficiency and oil quality (i.e. value) along with reduced greenhouse gas emissions and water consumption. Another advantage is that the non-condensable gases tend to have much greater solubility in the warm condensed solvent than in the hot steam condensate of a SAGD, so the ability of a solvent based process to remove non-condensable gases from the chamber is typically about 5 to 20 times better. However, solvent extraction processes have not yet been proven in the field. Further, as the solvent extraction process is applied to deeper and more gassy hydrocarbon reservoirs, it becomes increasingly difficult to avoid the accumulation of non-condensable gas in the chamber and the consequent loss in extraction rate.

What is desired is an improved method for removing the non-condensables from the extraction chamber in a solvent based gravity drainage process whether such gases arise from impurities co injected with the solvent or arising naturally from the in situ hydrocarbons as they are warmed and mobilized.

SUMMARY OF THE INVENTION

The present invention is directed to improved methods and apparatuses to remove less condensable barrier gases from the gravity drainage extraction chamber. The removal of such gases is desirable to permit a condensing solvent process to deliver heat (heat transfer) to the hydrocarbon extraction interface and to deliver high solvent concentrations to the extraction interface to improve the dilution effect (mass transfer) of the solvent on the hydrocarbons being extracted. Improved methods and apparatuses are desired to allow a solvent extraction process to be effective at chamber extraction conditions in which the amount of such gases present in the chamber is higher than can be reliably removed by the draining liquids alone.

The present invention is further directed to methods and apparatuses for a solvent extraction process that can remove less condensable gases from deeper reservoirs where the amount of naturally occurring dissolved gas within the hydrocarbons in place is typically higher than in shallower reservoirs. Where conditions permit, it is an aspect of this invention to operate in deeper reservoirs at pressures less than the original in situ pressure, which can permit condensing solvent conditions to be established in the deeper reservoir, but which will create a larger off gas or barrier gas problem. The methods and apparatuses of the present invention can be used in such reduced pressure extraction conditions to manage and remove the more prevalent non-condensable barrier gases.

The present invention is further directed to methods and apparatuses for a solvent extraction process that can remove less condensable gases from extraction chambers which are being operated at solvent to oil ratios (SOR) which are too low to remove, as liquids, enough of the barrier gases. At lower solvent to oil ratios the ability of the solvent to carry off the non-condensable gases as liquids is also reduced and the methods and apparatuses of the present invention can be used to manage and remove the excess barrier gases which are present within the chamber as a result of the extraction process. Lower SOR can be desirable for example by being able to decrease the extraction costs, by lowering the amount of solvent used and processing required.

The present invention is also directed to an improved process for removing less condensable gases from the extraction chamber that are transported into the chamber by the solvent itself, so that the solvent purity specifications can be relaxed somewhat as compared to the prior art.

It is a further aspect of the present invention to provide an extraction process which manages the accumulation of the less condensable or barrier gases within the extraction chamber to preferentially accumulate the gases in a position to discourage upward solvent channeling through the pay zone to the overburden, which will increase the SOR and in the worst case could lead to a loss of chamber confinement.

The present invention is therefore directed to methods and apparatuses for an in situ gravity drainage solvent extraction process for hydrocarbons which attempts to achieve high extraction rates while operating at reduced pressures and SOR's. The invention seeks to achieve these results by continuously managing the barrier gases within the chamber, to permit more effective heat and mass transfer from the solvent vapour to the bitumen and so to permit more cost effective bitumen recovery than can be achieved without management of these barrier gases.

There are several embodiments which are comprehended by this invention, including but not limited to managing the non-condensable gases in the chamber by providing a separate or dedicated flow path, most preferably a vapour flow path to remove these gases from the chamber. Additional aspects relate to management of the barrier gases within the chamber during extraction by sizing, shaping and positioning the vapour flow path and by inducing convective flow within the chamber, positioning a barrier gas layer within the formation to facilitate chamber confinement by limiting upward growth and solvent channeling within the chamber, and sizing and shaping the barrier gas layer within the chamber to reduce heat and solvent loss to the overburden.

Therefore according to one aspect, the present invention provides a process for recovering hydrocarbons from an in situ gravity drainage chamber having an injection well and a production well wherein the process includes the steps of:

injecting solvent vapour though an injection well into an underground extraction chamber;

mobilizing the hydrocarbon enough to permit said mobilized hydrocarbon to drain by gravity drainage;

managing barrier gases arising within said chamber during one or both of said injecting and mobilizing steps;

providing a separate vapour flow path for removal of said barrier gases; and removing at least some of said barrier gases from the chamber through said separate flow path.

According to a further aspect, the present invention provides a solvent assisted gravity drainage process for removing hydrocarbons from an underground formation, the process comprising the steps of:

injecting solvent vapour though an injection well into an underground extraction chamber;

depressurizing the hydrocarbons enough to cause barrier gases dissolved in the hydrocarbons to be released as vapors into said chamber;

positioning a separate flow path for removal of said barrier gases from said chamber; and managing a position of said barrier gases within said chamber to permit said solvent vapour to continue to condense at an extraction interface within said chamber.

In a further aspect of the present invention, the invention comprises a solvent assisted gravity drainage process for removing hydrocarbons from an underground formation through the formation of an extraction chamber having a sump, side wall extraction surfaces and a top extraction surface, the process comprising the steps of:

injecting solvent as a vapour into the formation;

warming and depressurizing the in situ hydrocarbons at a hydrocarbon interface enough to cause the hydrocarbons to drain by gravity drainage and to release barrier gases;

removing liquids from the chamber including solvent and bitumen; and preferentially accumulating said barrier gases towards a top of said chamber to limit heat losses through the top of said chamber.

The present invention is further directed to a process for the in situ extraction of hydrocarbons through solvent injection into a gravity drainage extraction chamber formed in an underground formation, the process comprising the steps of:

providing an exit flow path out of the chamber for removal of barrier gases that are present within the chamber during the extraction process, and removing at least some of the barrier gases from the chamber through said exit flow path to facilitate hydrocarbon extraction from the chamber.

BRIEF DESCRIPTION OF THE DRAWINGS

Reference will now be made to preferred embodiments of the present invention, by way of example only, in which:

FIG. 3 shows the relationships between fracture pressure, the initial reservoir pressure, propane critical pressure and propane saturation pressure. FIG. 3 also shows the relationship between solvent oil ratios and extraction pressures as a function of reservoir depth;

DETAILED DESCRIPTION OF THE PREFERRED EMBODIMENTS

In this specification the following terms shall have the following meanings. The term "barrier gases" shall mean gases other than solvent vapour that are found in a gravity drainage chamber. The gases will be primarily composed of gases such as methane and the primary source of the gases in most cases is the warming in situ hydrocarbon. However, there also may be additional gases, such as nitrogen, carbon dioxide and hydrogen sulphide, evolving from the hydrocarbon as well as gases that are introduced into the chamber as contaminants along with the solvent vapour. The gases that are most problematic and become barrier gases according to the present invention are those that have such a low solubility in condensed solvent and extracted hydrocarbon that they tend to preferentially accumulate in the chamber, and due to the flow of the solvent vapour outwardly, at the perimeter of the chamber. As explained in more detail below, the present invention is directed to the management of such barrier gases other than solvent that accumulate in the chamber.

The term "insulating" when used in association with barrier gases means that the temperature at the extraction interface 16 is lower than it would be if the insulating effect of the barrier gases was not present and the concentration of solvent at the interface is lower than it would be if no barrier gases were present. The effect of the insulation is not to block heat or mass transfer entirely but rather to cause a reduction in the hydrocarbon extraction rate.

The term "hydrocarbons" means heavy or viscous hydrocarbon oils and covers a wide range of in situ characteristics, such as might be found in underground reservoirs and comprehends bitumen, tars and heavy oil and other lighter grades of in situ oil.

"Stranded hydrocarbons" are those hydrocarbons of any viscosity that are not recoverable at commercially attractive extraction rates at original reservoir conditions but which if could be mobilized, would be considered suitable for extraction. In general the term stranded hydrocarbons means any in situ hydrocarbons that do not readily flow through the formation, and thus are difficult to recover.

In this specification the term "adiabatic SOR" means the solvent oil ratio required to achieve a specific temperature in the chamber assuming there are no external conduction heat losses through the perimeter of the chamber. It will be understood that the use of the adiabatic SOR is useful as an indicator of trends, but understates the actual SOR because it does not account for external heat losses from the chamber. Solvent gravity drainage process is any solvent based extraction process in which a solvent is injected into a formation to mobilize the in situ hydrocarbons, whether by diffusion or condensation and diffusion. All that is required is to provide enough mobilization of the hydrocarbons that they can flow at reservoir extraction conditions down side walls and into a sump in the extraction chamber where they can be removed as liquids. The term solvent comprehends any material that acts as a solvent on the hydrocarbons and includes alkanes such as propane, ethane, butane and pentane and related isomers, alkenes or the like. In general a more preferred solvent is propane.

Figure 1:
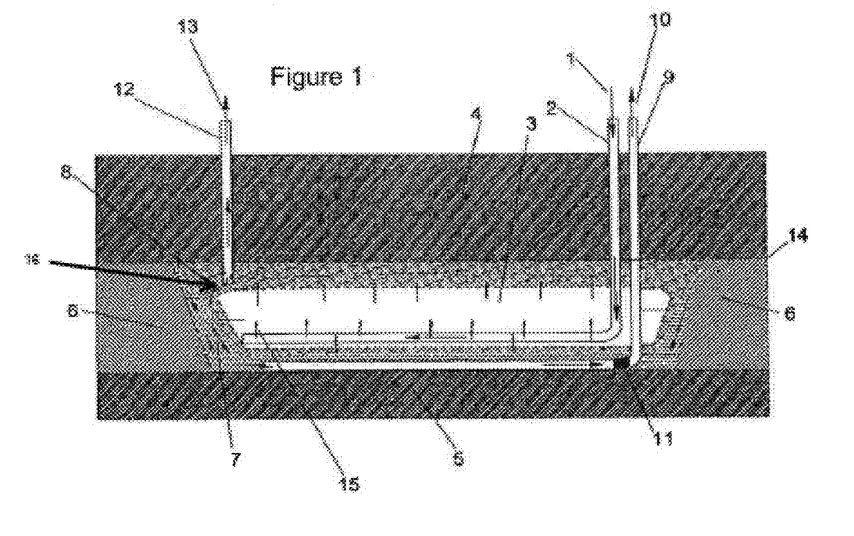
FIG. 1 shows a gravity drainage chamber according to one aspect of the present invention.

FIG. 1 shows a gravity drainage extraction chamber 3 according to the present invention with injection well 2 and a production well 9. The chamber 3 is confined by an overburden 4 and an underburden 5. Extraction of the hydrocarbon pay zone 6 leads to mobilization and drainage of the hydrocarbon solvent liquids 7 downwards where they are collected in the production well 9 located in the sump of the chamber 3 and the liquids may be pumped via a pump 11 to surface if artificial lift is required. A barrier gas blanket 8 accumulates at the perimeter of the chamber 3 which reduces the extraction rate.

The present invention provides that a preferred way to mitigate the harmful effects of the barrier gas accumulation is to provide a separate flow path out of the chamber through which at least some of the barrier gases can be removed. In the most preferred form of the invention the flow path is a vapour flow path and is sized, shaped and positioned to manage the distribution of barrier gases with the chamber and to permit the removal of the barrier gases to facilitate the extraction process as explained in more detail below. FIG. 1 shows a separate vapour path 12 which is connected between the chamber and a processing facility on the surface to provide the separate flow path for the removal of non-condensable gases 13 from the chamber. As can be seen, the flow path 12 provides for extraction of at least some of the chamber vapour from an upper portion or towards the top of the extraction chamber. Thus, in its simplest form, the present invention comprehends the step of providing at least one flow path 12 as shown in FIG. 1 to simply remove at least some of the barrier gases from the chamber. However, a single vertical flow path is not the most preferred as it would be difficult to reliably remove enough barrier gas through such a single extraction point, considering that as the chamber could be quite large (gravity drainage wells are often more than 700 m long). Therefore, the present invention comprehends various flow path configurations as described in more detail below.

Figure 2:
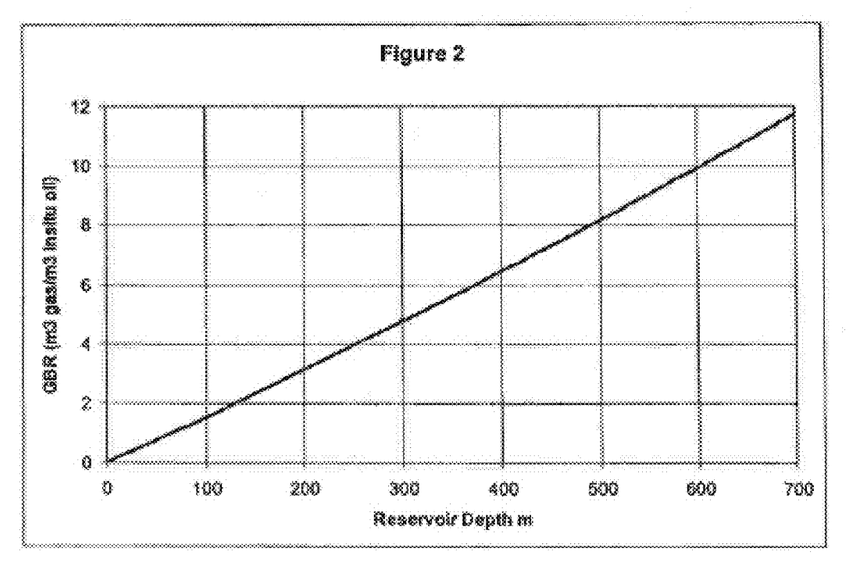
FIG. 2 shows a schematic of the general trend between the amount of gas dissolved in the bitumen and the burial depth for the formation.

FIG. 2 shows the general trend of increasing gas content in the in situ oil or bitumen with increasing depth for some heavy oil and bitumen reservoirs in Alberta. This trend is generally consistent with the oil being saturated with gas at reservoir pressure but with no free gas (i.e. pockets of gas) being present in the oil formation. For example, the Athabasca reservoir at the former underground test facility (UTF) is about 140 m deep and has an expected GBR of about 2. Similarly, the Peace River at 550 m has a reported GBR of about 10. The trend of FIG. 2 is indicative, but will vary from reservoir to reservoir, depending upon the local geological history. The barrier gases present in the chamber during the extraction generally come from the original in situ gas shown in FIG. 2, but a portion can also come as impurities introduced with the solvent.

Figure 3:
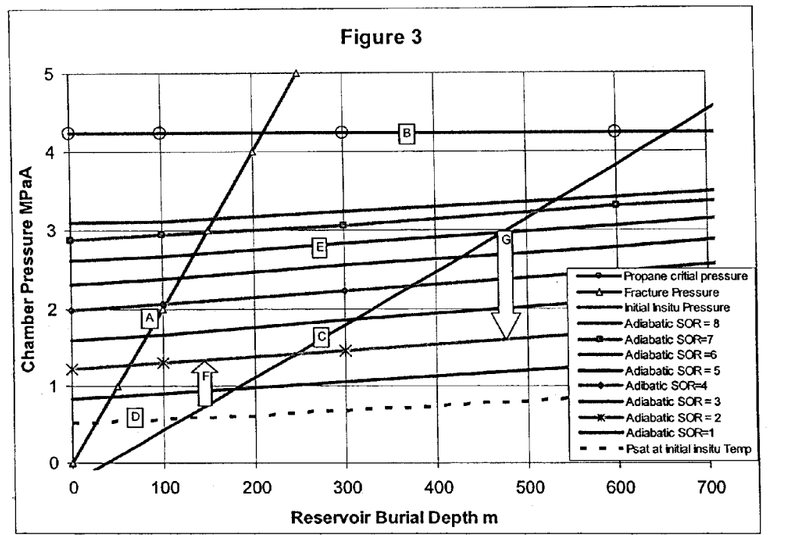

FIG. 3 shows a number of pressure characteristics and how they vary with reservoir depth. The line identified as A is the formation fracture pressure (for formations composed of sand such as the Alberta tar sands) and indicates the extraction or chamber pressure that would result in the propagation of a fracture and subsequent loss of chamber confinement. The fracture pressure is a maximum that should not be exceeded otherwise the bitumen resource may become unrecoverable by solvent vapour processes. A fracture could result in loss of vapour confinement and is to be avoided.

Line B on FIG. 3 shows the critical pressure of a preferred solvent, namely propane. The line B is horizontal because it is an intrinsic property of the solvent and does not vary with depth. Propane does not have a distinct gas and liquid phase at pressures above line B, so condensing propane is unable to deliver a latent heat of condensation at pressures above 4.2 MPa.

Line C is a trend line that matches the initial in situ reservoir pressure. The initial reservoir pressure will vary from reservoir to reservoir, so the trend shown by line C is indicative but not predictive for a particular reservoir. Line C is particularly important if the extraction zone is weakly confined or in communication with more porous regions of the formation, which are referred to as thief zones. In this case it is preferred to use extraction conditions which are as close to line C as possible, to minimize the risk of water or barrier gas inflow and consequent loss of effective heat and solvent transfer as well as to minimize the potential for solvent loss out of the extraction chamber through the thief zones.

Line D on FIG. 3 is the saturation pressure of propane at initial or original in situ reservoir temperature. Line D therefore is the lowest pressure at which a liquid propane phase can exist in the extraction chamber in the reservoir. For extraction conditions which coincide with conditions below line D there can only be propane vapour and the propane content in draining oil is determined by solubility characteristics of solvent vapour into the hydrocarbon (by diffusion) rather than the heating and solvent dilution effects of a condensing solvent process.

FIG. 3 also shows a series of theoretical trend lines labeled adiabatic solvent to oil ratio (SOR) equals 1, 2, 3 . . . through 8. These adiabatic SOR lines have been calculated based on using condensing conditions within the extraction chamber and assuming a 33.5% porosity of the formation and a 77% bitumen saturation for a theoretical reservoir. For example, if the target reservoir was 255 m deep, then a pressure of about 1.5 MPa would be required to match initial reservoir pressure. In this case the adiabatic SOR would be 2. Since the theoretical adiabatic SOR as calculated doesn't account for external heat loss such as conduction heat loss into the overburden and underburden, it will be understood by those skilled in the art that the actual SOR for an actual reservoir would be somewhat higher. The actual SOR depends on a number of other variables including the spacing between wells and the pay thickness as thinner reservoirs lose proportionately more heat to the overburden and underburden. It will be understood that the actual SOR will be some larger amount than the adiabatic SOR identified in the figures, and the exact amount will vary from reservoir to reservoir. For ease of understanding, estimates are made herein of what actual SOR might be, but the present invention is not limited to any particular actual SOR, as each reservoir will need to be measured, at each step of the extraction, to determine the actual SOR. If for example, the external conduction heat losses are comparable to the heat required to heat the bitumen sand and water within the chamber then the actual SOR would be 4 (=2+2) for a reservoir at 255 m depth. This means that for a condensing solvent process to match the in situ pressure at 255 m depth, 4 volumes of solvent must be condensed and recycled to obtain one volume of oil. This volume ratio is comparable to a steam oil ratio in many conventional SAGD operations and the commercial attractiveness of the solvent extraction process arises because the solvent collection, separation, purification, revaporization and reinjection costs can be much less than for steam, not to mention reduced water and energy consumption.

FIG. 3 shows that the solvent to oil ratio (SOR) climbs dramatically to match the in situ pressure in deeper reservoirs (i.e. line C). This is because the latent heat of condensation decreases at higher pressures and the heat energy required for the heat balance increases. Line E shows schematically that at some threshold SOR, the solvent based gravity drainage extraction process will become uneconomic due to excessive solvent processing costs (i.e. too high an SOR ratio). For example, at 470 m depth the adiabatic SOR to match reservoir pressure would be 6. If by way of example, the external conduction heat loss from the chamber matches the energy requirement to heat the sand and bitumen, then the expected SOR would be 12 (=6+6). Although the actual economic limit will depend on specific prices for process equipment, it is believed the economics of processing 12 volumes of solvent with currently available technologies to obtain just one volume of oil might be marginal.

Figure 4:
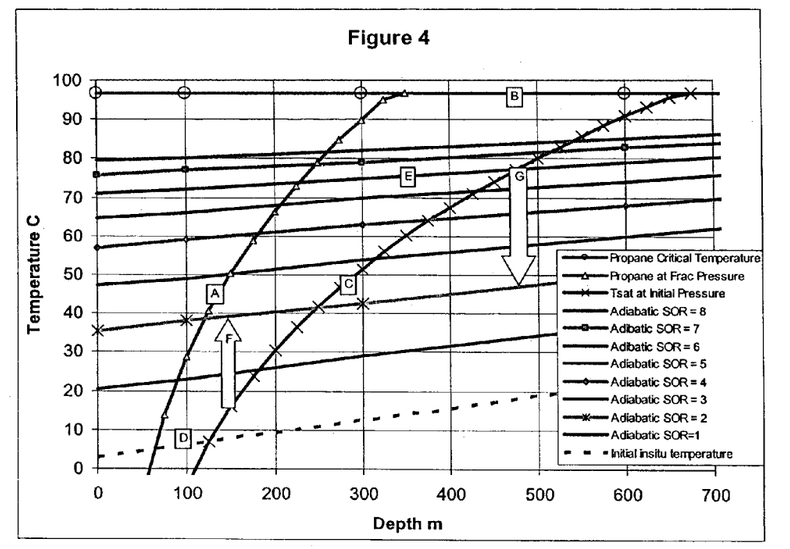
FIG. 4 shows comparable data to FIG. 3 pertaining to temperature.

FIG. 4 shows a similar set of data to FIG. 3 except that the temperatures are presented rather than the pressures. Lines A, B, E, C and D relate to the same constraints as discussed above for FIG. 3.

Figure 5:
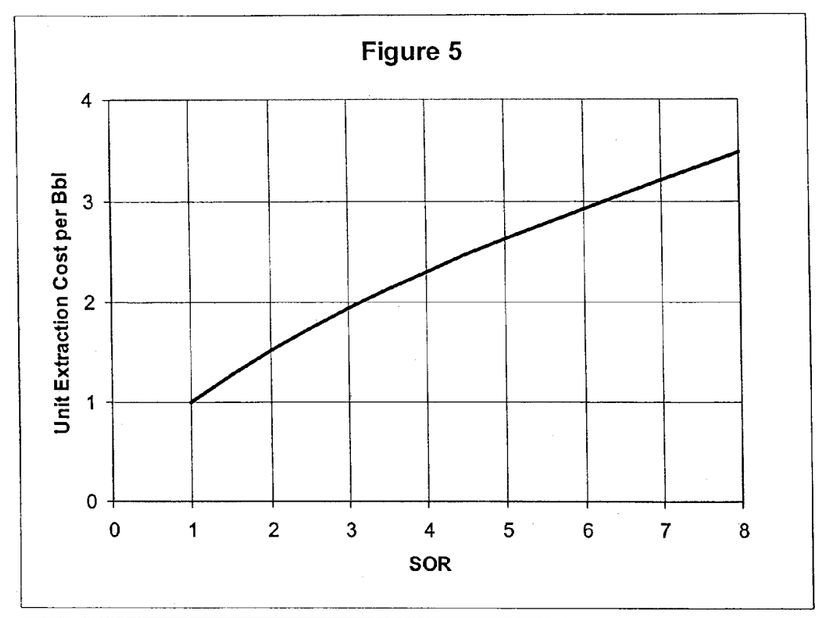
FIG. 5 shows the relationship between unit extraction cost and SOR.

FIG. 5 shows the general trend between unit extraction costs and solvent oil ratio. It is assumed that the capital and operating costs scale as the 0.6 power of the process capacity. Thus, as the SOR increases from 1 to 6, the capital and operating expenses increase by a corresponding factor of 3. Thus, it is more economical to operate at lower SORs than higher SORs but one would expect to achieve much higher extraction rates at higher SORs than at lower SORs.

Line C of FIGS. 3 and 4 can be appreciated in more detail now. In shallow bitumen reservoirs, it is generally desirable to raise the reservoir pressure above the initial reservoir pressure, in order to raise the extraction chamber temperature and achieve higher extraction rates, as shown by arrow F. The 25 C temperature rise above naturally occurring reservoir temperatures represented by arrow F in FIG. 4 will greatly increase the extraction rate, for example, by an estimated amount of more than an order of magnitude and will thereby provide commercially attractive extraction rates. The arrow F in FIG. 3 shows the amount of pressure rise required above naturally occurring reservoir pressure to achieve the temperature rise of FIG. 4. This temperature rise is achieved by a pressure rise of only about 0.5 MPa. For weakly confined formations though, even such a low pressure rise might be problematic as it will encourage a loss of confinement and a consequent loss of solvent.

In deeper reservoirs it is desirable to operate below line C as shown by arrow G if one uses the preferred solvent propane. Because of the high original in situ pressure, operation of the extraction process at reduced pressure reduces the solvent oil ratio and consequently the unit operating and capital costs. Operation at reduced pressure will provide elevated extraction chamber temperatures (FIG. 4 shows almost a 30 C rise compared to initial reservoir temperature which is displayed as the gap between the lower tip of the arrow G and the dashed line D representing the original in situ temperature.). Operation at reduced pressure also has the advantage that the risk of solvent loss is eliminated, because the higher surrounding pressure will confine the solvent to being within the chamber. Although the extraction rate is expected to be somewhat below a theoretical maximum due to operation at temperatures below line C, FIG. 5 shows that the per barrel extraction costs are estimated to be reduced by half, because of the lower SOR that is being used. What is desired is to obtain an economical extraction rate, not necessarily the fastest possible extraction rate, if such a faster extraction rate requires too high an SOR and hence too large a processing facility.

Arrow G on FIGS. 3 and 4 shows a target adiabatic SOR of 2. The target SOR for a particular reservoir will depend on many factors including among other things the presence of thief zones, the cost of capital and cost of solvent and price of oil. As the target SOR is reduced, the capital and operating per unit extraction costs are also reduced but the extraction rate is also reduced. At very low extraction rates, the diffusion of the barrier gas away from the interface can result in a thicker and more diffuse gas blanket. This in turn reduces the buoyancy of the barrier gas and the efficient displacement and consequent removal of the barrier gas to the top of the chamber. In general therefore, the present invention comprehends using a solvent injection rate that ensures the solvent is, on balance, flowing out and onto the extraction interface 16 at sufficient speed to achieve economic extraction rates. In general, this means at a rate that is fast enough to achieve elevated concentrations of the barrier gases at the perimeter of the chamber because the diffusion rate of the barrier gas away from the interface is slower than the inflow rate of solvent onto the interface.

The present invention comprehends that the actual extraction pressure and SOR will vary over time, depending upon various factors, such as the size of the chamber and the like. When the chamber is smaller, higher pressures and SOR may be used to aggressively grow the chamber and as the chamber grows bigger, the pressure and SOR may be reduced, as the amount of hydrocarbon being extracted increases due to the larger extraction interface 16. All that is required is to encourage enough change in the mobility of the in situ hydrocarbons to permit the previously stranded hydrocarbons to flow within the chamber. According to the present invention this can be effective at something less than the theoretic maximum decrease in viscosity that is achievable at higher pressures and SORs.

Although desirable for the above reasons, operation at reduced pressure and/or reduced SOR creates some other problems. For example, as shown by arrow G, a reduced pressure also reduces the volume of produced liquids and consequently reduces the ability of the produced fluids to remove the non-condensable barrier gases from the chamber. Furthermore, it increases the risk that non-condensable gases will flow into the chamber and further reduce the extraction rate. However, operation at reduced pressure as shown by arrow G can provide economic results, if the non-condensable gas barrier issue can be addressed. Therefore, the present invention comprehends addressing the increased barrier gas problem that arises at the preferred reduced pressure operating conditions. In one embodiment, means for non-condensable gas to be removed from the chamber is provided via a separate vapour path as show by 12 in FIG. 1.

Figure 6:
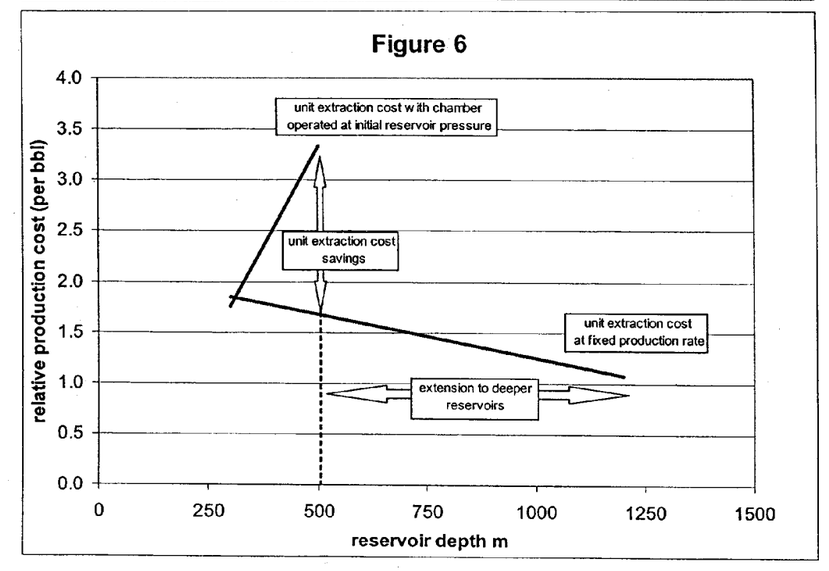
FIG. 6 shows a schematic of the potential unit operating cost benefit achieved by operating at reduced pressure and reduced SOR in deeper reservoirs.

The benefits of the present invention can now be better appreciated with reference to FIG. 6. FIG. 6 shows that the provision of a separate vapour path for removal of barrier gases allows the solvent extraction process to operate at lower pressures, temperatures and solvent oil ratios thereby reducing the unit extraction costs for reservoirs shallower than about 500 m In addition, to these unit cost savings for shallow reservoirs, FIG. 6 shows that the present invention also enlarges the range of target reservoirs to include reservoirs deeper than 500 m that would otherwise be inaccessible due to requirement for high operating pressures and excessive solvent oil ratios.

Figure 7:
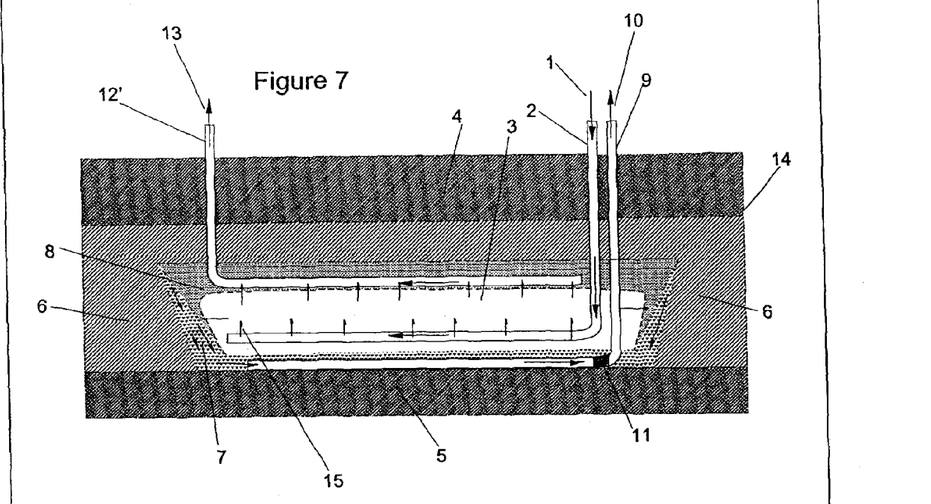
FIG. 7 shows a schematic of a well arrangement which places a gas blanket barrier at the top of the formation to limit the vertical growth of the chamber.

A solvent assisted gravity drainage extraction chamber according to another embodiment of the present invention is shown in FIG. 7 at 3. In this Figure like numbers are used to describe like elements as found in FIG. 1. The chamber 3 is formed within a hydrocarbon containing formation comprising an oil-bearing zone 6 with an overburden 4 and an underburden 5. The interface between the overburden 4 and the oil-bearing zone is indicated generally with the number 14. The chamber 3 contains a well 2 to inject solvent 1 into the chamber 3. The solvent 1 exits from the injection well 2 and travels 15 towards the perimeter of the chamber 3 where it encounters reduced (i.e. colder) temperatures and consequently condenses. The hot solvent condensate mobilizes the in situ bitumen and the heated liquids 7 drain towards the bottom of chamber 3. A production well 9, collects drained fluids 10 and may use a pump 11 or other artificial lift means to lift the produced fluid above grade.

Naturally occurring gas dissolved in the heavy oil or hydrocarbons is released as the heavy oil is heated and collects in the chamber. Due to the flow of solvent vapour outwardly from the injection well towards the cold interface where it condenses, a barrier gas blanket arises as is shown schematically as 8. In this embodiment the vapour path 12' provides a means to remove at least some of the accumulated barrier gases 13 from the blanket 8 to improve heat transfer between the solvent vapour introduced into the extraction chamber 3 and the liquefied bitumen 7. It will be noted that the vapour path 12' is generally horizontal as it traverses the chamber and thus provides a greater degree of intersection with the extraction chamber than the embodiment 12 of FIG. 1. According to this embodiment a plurality of extraction points can be located on the vapour flow path through which chamber vapours, including a portion of the barrier gases, may be removed.

As previously described, maintaining a liquid head over the production well to prevent solvent vapour short circuiting will be very effective at trapping and accumulating the barrier gases in the extraction chamber because the solubility of these naturally arising barrier gases in the draining liquids is too low to prevent the accumulation. Unless there is a loss of confinement within the formation, and assuming a sufficient solvent injection rate, the barrier gases will create the gas blanket at the extraction interface 16 that will accumulate in thickness over time, and if left unchecked will eventually be sufficient to seriously compromise the hydrocarbon mobilization and extraction process. This point will be reached when the barrier gas concentrations within the extraction chamber are high enough to interfere with efficient heat and mass transfer from the solvent to the hydrocarbons, and would physically manifest as a thick and thermally insulating barrier gas blanket on the extraction surfaces of the chamber.

To mitigate the thermal resistance of the gas blanket, the present invention provides methods of physically moving or displacing the gas blanket away from the extraction interface 16 and from the chamber, including by drawing the gases, including at least some barrier gases, out from the chamber through the separate flow path 12', or managing the position of the barrier gas within the chamber as explained in more detail below. The separate flow path is configured to extract vapours from the chamber and will likely extract a mixture of barrier gas and solvent gas in proportions which vary according to the concentrations of these gases within the chamber adjacent to the extraction point. In the most preferred form of the invention the separate flow path provides a plurality of discrete extraction points along its length to sweep the barrier gases into the flow path from a plurality of positions within the chamber. A negative pressure can be applied to the separate flow path to encourage the chamber gases including the barrier gases to be drawn into the flow path. Entrance control is also contemplated at the extraction points to permit the extraction points to be more effective in removing the barrier gases. The extraction control can be based on temperature of the gases in the chamber at the extraction point, relative concentrations of the barrier gases and the solvent vapour or other criteria which can be used to determine when and how much gas to draw out of the chamber through the separate vapour path 12' or any extraction point located on the path 12'. In the most preferred form the exit path 12' for the gases is located towards a top of the chamber as shown in FIG. 7.

In addition, the present invention comprehends a means to concentrate the barrier gases to facilitate their removal from the chamber. In the most preferred embodiment this takes the form of a surface facility to separate the barrier gas from the solvent gas as explained in more detail below, but the below grade separation of the barrier gas from the solvent gas is also comprehended. For example, the separate flow path could be configured to preferentially remove more of the barrier gas, through use of filters, condensing elements or the like. However, provided that a sufficient amount of barrier gas can be removed as a vapour and as part of the mixture of gas vapours within the chamber, such in situ concentrating steps are not considered essential.

The flow path 12' will naturally experience some solvent condensation due to the mixture of gas being extracted. Liquid solvent hold up in the flow path 12' can prevent further barrier gas removal. This type of blockage will need to be removed. A number of means may be used including briefly reversing the flow in the flow path, inserting a pump, using insulated tubing or using other techniques such a plungers or the like to overcome this liquid barrier to the removal of gas through the flow path. This natural condensation is one means of preferentially removing barrier gases from the chamber, as when the more condensable solvent condenses, the less condensable barrier gases will in effect be concentrated.

FIG. 7 shows a side view of the extraction chamber with the separate vapour pathway 12' located some distance below the top of the formation. FIG. 7 shows the hydrocarbon bearing zone extending above the barrier gas layer.

Figure 8:
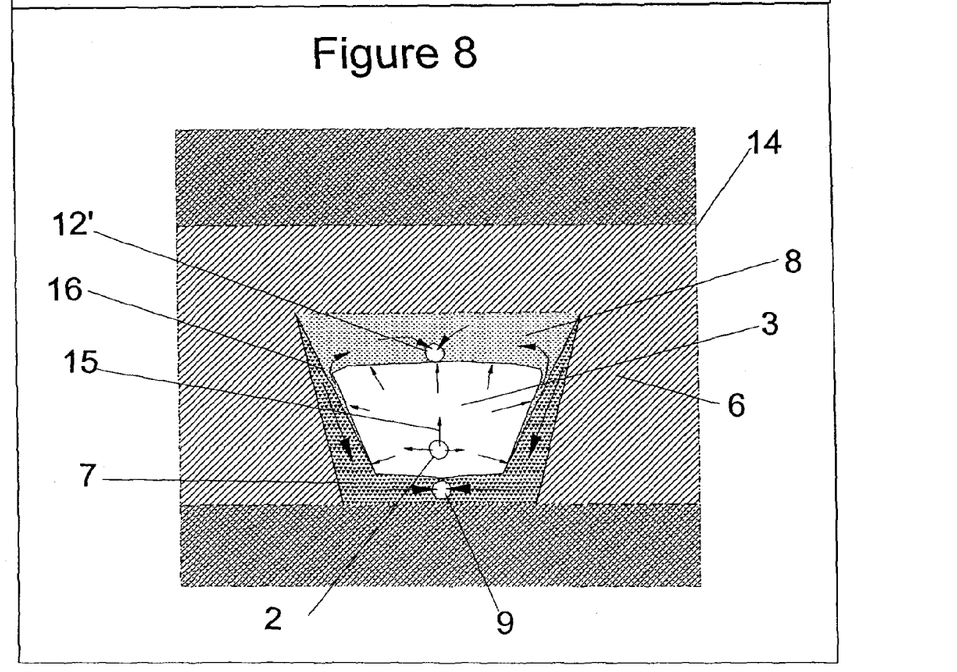
FIG. 8 shows a cross-sectional view of the chamber of FIG. 7.

FIG. 8 shows the horizontal well configuration of FIG. 7 in cross section. According to the present invention the preferred solvent gas is heavier than the main constituents of the barrier gas. For example, the most prevalent barrier gas is methane, while the preferred solvent is propane. Methane gas is considerably lighter than propane gas meaning that there will be a tendency for the methane to float up within the extraction chamber, (provided it remains concentrated at the extraction surface and has not widely diffused into the propane) and in the event there is an accumulation of methane, for the propane to flow across the chamber underneath the methane within the chamber. The barrier gases flow upwards as shown by arrows 15, due to the buoyancy of the barrier gas relative to the solvent gas and its high concentration. The barrier gas blanket will thus thin as the barrier gas moves away from the generally vertical sidewalls of the extraction chamber as it flows continuously upwards towards the top of the extraction chamber. Locating thicker and concentrated gas blankets at the top of the chamber is an aspect of the present invention, as an upper barrier layer will tend to reduce heat losses through the top of the chamber to the overburden. The present invention also comprehends preventing the upper barrier layer from becoming too thick such that it begins to interfere with the extraction process in a significant way. Furthermore, the thicker barrier gas layer at the top of the chamber can be used according to the present invention to limit upward extraction or solvent channeling. At a certain thickness of the barrier gas layer, there will be little if any additional vertical extraction, meaning that heat losses to the overburden are also reduced and minimized. Thus, a top floating barrier gas blanket can be used to reduce the rate of upward chamber growth and delay a loss of confinement through solvent channeling and thereby prevent a solvent chamber blow out.

It can now be understood that the position of the flow path, and more specifically the extraction points in the chamber into the flow path, can be used as a means to position and control the thickness of the accumulated gas blanket, which is configured as a floating layer at the top of a chamber. More specifically, by positioning at least one flow path 12' at a predetermined distance below the top of the pay zone a highly insulating gas blanket can be positioned and maintained near the top of the chamber. The thickness of the blanket can be set by the vertical position of the flow path, and can be chosen so that it greatly reduces or stops the vertical extraction (and heat loss) of the chamber while still encouraging rapid horizontal growth and commercially attractive extraction rates. The position of the extraction points of the flow path can also be used to control the thickness of the floating gas blanket, by removing barrier gases from the chamber once they form a layer which extends down from a top of the chamber far enough. Depending upon the position of the flow path as compared to the lower surface of the floating gas blanket, more or less solvent vapour will also be removed from the extraction chamber. As can now be appreciated, by positioning the extraction points at a predetermined level below the top of the pay zone, an upper limit can be defined for the vertical extraction.

It can now be appreciated that an aspect of the present invention is to recover or remove the barrier gases from the chamber at a rate which prevents the barrier gas from rendering the extraction process uneconomic. While the positioning of the extraction points of the flow path is such as to be located in regions of high barrier gas concentration, other methods for preferentially removing barrier gases rather than solvent gas are comprehended. These include the temperature and concentration controls mentioned above and filters and the like that may permit methane to pass while limiting the passage of, for example, propane.

Figure 9:
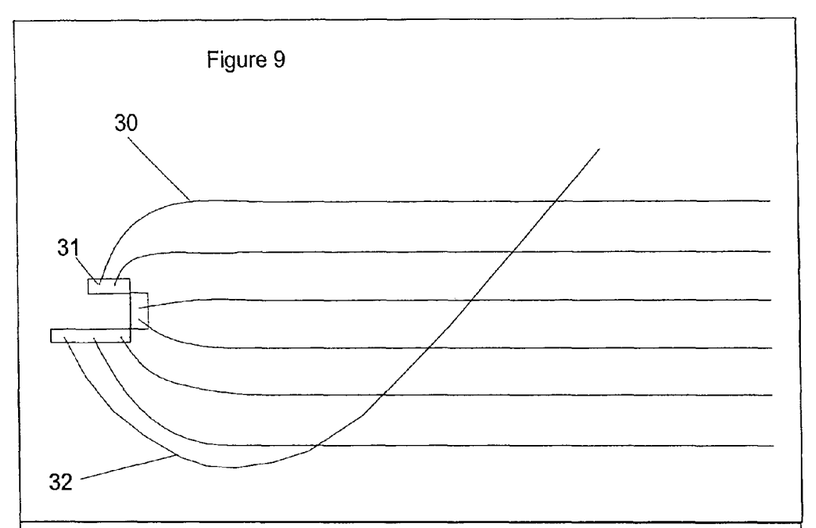
FIG. 9 shows a schematic layout for a pad consisting of 6 horizontal well pairs with an additional purge or vent well according to another aspect of the present invention.

FIG. 9 shows a further embodiment of the present invention. FIG. 9 shows a well pad 31, containing a number of well pairs, with an additional nonparallel horizontal flow path 32 across the injection and production wells 30 in the pad. This flow path 32 would be preferentially located close to a structural high in the hydrocarbon bearing formation to facilitate collection of the gas blanket from the top of the chamber. While only one such flow path is shown in the figures, the present invention comprehends that more than one can be used, as required to obtain the desired control or management and removal of the barrier gases from the extraction chamber.

One of the aspects of the present invention is to remove the barrier gases from the chamber in a controlled fashion. Preferred removal rates range from by weight percent, 0.1%, to 0.5%, to 1%, to 3% to 5% and to 10% of the solvent injection rates. Alternatively, the removal rate can be controlled by measuring the temperature and/or concentration of the gas mixture taken out of the chamber such that enough barrier gas is removed to control the blanket thickness and the actual amounts removed will vary according to extraction chamber conditions.

Figure 10:
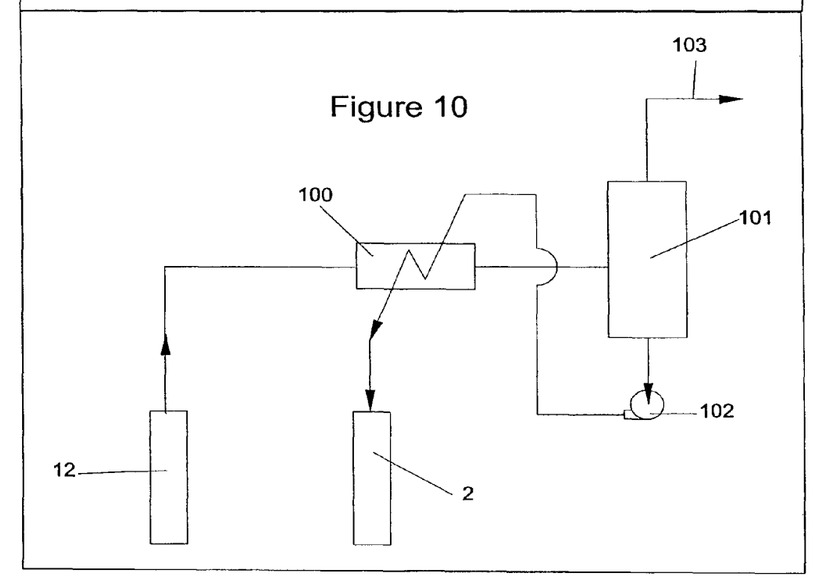
FIG. 10 shows a facility to separate the non-condensable gas produced from the purge well and return the vaporized and purified solvent back to the extraction chamber.

A surface facility to separate barrier gases such as methane 103 from the vapour mixture taken from the extraction chamber is shown schematically in FIG. 10. This facility could use any convenient separation process 101 including distillation, flash, membrane separation and the like. It is also comprehended that the surface facility would include heat exchangers 100, pumps 102 and the like to strip the gases 103 from the solvent. The solvent may be re-injected back into the reservoir via injection well 2 if desired. The separated methane can be used for fuel gas. While the discussion has specifically mentioned propane as a solvent other solvents may be preferred, such as butane, carbon dioxide, ethane, pentane etc., depending on the temperature and pressure of the target pay zone.

In the foregoing description reference was made to preferred embodiments of the invention. It will be understood by those skilled in the art that various modifications and alterations can be made to the invention without departing from the broad scope of the claims that are attached. Some of these modifications have been described above and others will be apparent to those skilled in the art.

We claim:

1. A process for recovering hydrocarbons from an in situ underground gravity drainage extraction chamber having an injection well and a production well, said process comprising the steps of:

injecting solvent vapour into a hydrocarbon deposit through said injection well, which forms said underground extraction chamber through said injection well generally around said injection well;

mobilizing the hydrocarbon to permit said mobilized hydrocarbon to drain by gravity drainage by condensing said solvent onto said hydrocarbon to warm and dilute said hydrocarbon; and managing barrier gases which accumulate within said chamber and form a gas blanket at an extraction interface by;

providing a separate vapour flow path from said underground extraction chamber, said separate vapour flow path being separate from both said injection well and said production well, and configured for removal of said barrier gases;

removing at least some of said barrier gases from said extraction interface of the underground extraction chamber through said separate vapour flow path, and placing said injection well generally above said production well, both of said wells being located within said hydrocarbon deposit.

2. The process for recovering hydrocarbons from an in situ formation as claimed in claim 1 wherein said flow path includes a plurality of extraction points and said barrier gases are removed through said plurality of extraction points.

3. The process for recovering hydrocarbons from an in situ formation as claimed in claim 1 wherein said step of removing barrier gases includes the step of monitoring a temperature of vapours removed from said underground extraction chamber through said separate vapour flow path and determining the presence of barrier gases by said measured temperatures.

4. The process for recovering hydrocarbons from an in situ formation as claimed in claim 1 wherein the gas composition of vapours removed from said underground extraction chamber through said separate vapour flow path is monitored to determine the presence of barrier gases.

5. The process for recovering hydrocarbons from an in situ formation as claimed in claim 1 wherein said flow path includes filters to remove said barrier gases.

6. The process for recovering hydrocarbons from an in situ formation as claimed in claim 1 wherein the separate vapour flow path terminates at a top of said extraction chamber, and said step of removing at least some of said barrier gases comprises removing at least some of said barrier gases from said top of said extraction chamber.

7. The process for recovering hydrocarbons from an in situ formation as claimed in claim 1 wherein the step of removing said barrier gases from said chamber includes the step of positioning said flow path in said chamber at a location where said barrier gases accumulate.

8. The process for recovering hydrocarbons from an in situ formation as claimed in claim 7 including the step of selecting a solvent gas that is heavier than said barrier gas to permit said barrier gas to accumulate at a top of said chamber.

9. The process for recovering hydrocarbons from an in situ formation as claimed in claim 8, further including the step of positioning said flow path towards a top of said extraction chamber.

10. The process for recovering hydrocarbons from an in situ formation as claimed in claim 9 wherein said flow path is positioned adjacent to, but below, a top of a hydrocarbon bearing zone in said formation.

11. The process for recovering hydrocarbons from an in situ formation as claimed in claim 10 wherein said flow path is sized, shaped and positioned to permit a thickness of said barrier gas layer at a top of said pay zone to be controlled.

12. A solvent assisted gravity drainage process for removing hydrocarbons from an underground formation through the formation of an extraction chamber having a sump, side wall extraction surfaces and a top extraction surface, the process comprising the steps of:

injecting solvent as a vapour into the hydrocarbon deposit through an injection well to form said underground chamber generally around said injection well;

condensing said solvent onto a perimeter of said extraction chamber;

warming and depressurizing the in situ hydrocarbons at a hydrocarbon extraction interface to cause the hydrocarbons to drain by gravity drainage and to release barrier gases;

removing liquids from the sump of the extraction chamber, said liquids including solvent and hydrocarbon; and accumulating said barrier gases towards a top of said chamber to insulate the top of said extraction chamber from said condensing solvent vapour to limit upward chamber growth.

13. The solvent assisted gravity drainage process for removing hydrocarbons from an underground formation as claimed in claim 12 further including the step of removing at least some of said barrier gases from a location towards said top of chamber.

14. A solvent assisted gravity drainage process for removing hydrocarbons from an underground formation having an injection well and a production well, the process comprising the steps of:

injecting solvent vapour through said injection well into a hydrocarbon deposit through said injection well, which forms said an underground extraction chamber generally around said injection well;

condensing said solvent onto a perimeter of said extraction chamber;

depressurizing the hydrocarbons to cause barrier gases dissolved in the hydrocarbons to be released as vapors into said underground extraction chamber to form a barrier gas blanket at an extraction interface;

positioning a separate flow path in said underground extraction chamber, said separate flow path being separate from both said injection well and said production well, and configured for removal of said barrier gases from said chamber;

managing a position of said barrier gases within said chamber to permit said solvent vapour to continue to condense at an extraction interface within said chamber, and placing said injection well generally above said production well, both of said wells being located within said hydrocarbon deposit, wherein through removal of said barrier gases said process operates at a reduced pressure as compared to not removing said barrier gases.

15. The process for recovering hydrocarbons from an in situ formation as claimed in claim 14 wherein the separate vapour flow path terminates at a top of said extraction chamber, and said step of removing at least some of said barrier gases comprises removing at least some of said barrier gases from said top of said extraction chamber.

16. A process for the in situ extraction of hydrocarbons through solvent injection into a gravity drainage extraction chamber formed in an underground formation having an injection well and a production well, the process comprising the steps of:

positioning said injection well generally above said production well, both of said wells being located within said hydrocarbon deposit;

injecting solvent vapour through said injection well into said hydrocarbon deposit to form said underground extraction chamber generally around said injection well;

condensing said solvent onto a perimeter of said extraction chamber;

providing an exit flow path in said extraction chamber, said exit flow path being separate from both said injection well and said production well, and configured for removal of barrier gases that are present within the chamber during the extraction process, out of the chamber; and removing at least some of the barrier gases from the chamber through said exit flow path to facilitate continued hydrocarbon extraction from the chamber through continued solvent condensation at reduced solvent to oil ratios (SOR) as compared to not removing said barrier gases.

17. The process for recovering hydrocarbons from an in situ formation as claimed in claim 16 wherein the separate vapour flow path terminates at a top of said extraction chamber, and said step of removing at least some of said barrier gases comprises removing at least some of said barrier gases from said top of said extraction chamber.

18. A solvent assisted gravity drainage process for removing hydrocarbons from an underground formation, the process comprising the steps of:
    injecting solvent as a vapour into an extraction chamber formed around an injection well within a hydrocarbon deposit within the formation;
    condensing said solvent onto a perimeter of said extraction chamber;
    warming the in situ hydrocarbons at a hydrocarbon interface by means of a latent heat of condensation of said solvent to cause the hydrocarbons to drain by gravity drainage to expand said extraction chamber;
    removing liquids from the extraction chamber including solvent and hydrocarbons; and
    removing gases from the chamber through a separate vapour flow path from said production well wherein said gases removed include at least some barrier gases which form a gas blanket at an extraction interface to permit continued condensation at said hydrocarbon interface by said solvent.

19. The solvent assisted gravity drainage process for removing hydrocarbons from an underground formation as claimed in claim 18 wherein said barrier gases are concentrated before being removed to a surface facility.

20. The solvent assisted gravity drainage process for removing hydrocarbons from an underground formation as claimed in claim 13 wherein said barrier gases are concentrated by being accumulated in an upper layer within said chamber.

21. The solvent assisted gravity drainage process for removing hydrocarbons from an underground formation as claimed in claim 18 wherein said solvent is propane and said process includes permitting the natural buoyancy of methane relative to propane to concentrate the barrier gas towards a top of the chamber.

22. An apparatus for a solvent assisted gravity drainage extraction process having an extraction chamber in the formation including at least a solvent injection well, a liquids production well, and a vapour flow path to remove vapours from the chamber, wherein said vapours include barrier gases and wherein said vapour flow path is separate from both the injection well and the production well, and configured for removal of said barrier gases from said extraction chamber.

23. The apparatus for a solvent assisted gravity drainage extraction process as claimed in claim 22 further including a means to concentrate barrier gases removed from said chamber through said vapour flow path.

24. The apparatus for a solvent assisted gravity drainage extraction process as claimed in claim 23 further including a means to separate said vapours removed from said chamber into separate gases.

* * * * *